Oct. 16, 1956 R. KAISER 2,766,804
TOOL FOR ASSEMBLING A NIPPLE ON A HOSE
Filed June 23, 1950
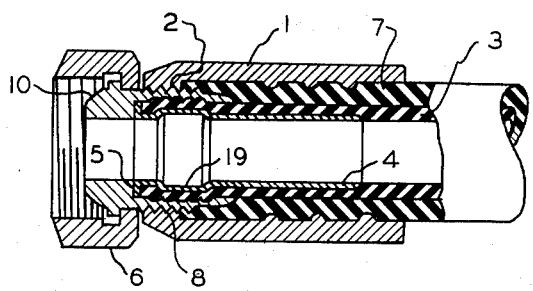
FIG. I.
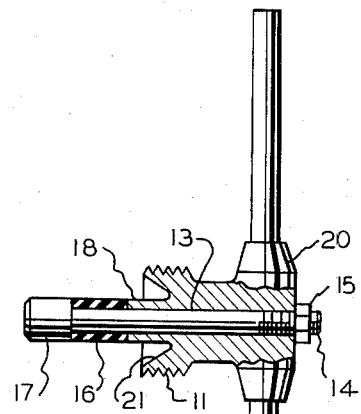
FIG. II.
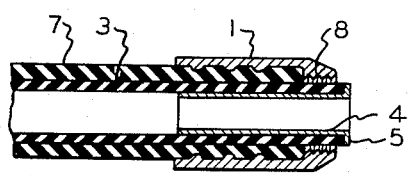
FIG. III.
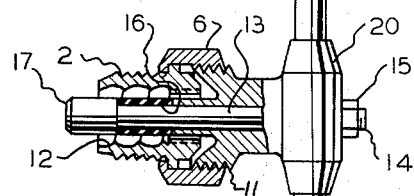
FIG. IV.
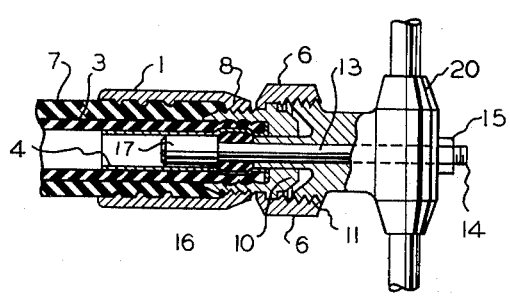
FIG. V.
INVENTOR
RUDOLF KAISER
BY Townsend F. Beaman
ATTORNEY

United States Patent Office 2,766,804
Patented Oct. 16, 1956

2,766,804

TOOL FOR ASSEMBLING A NIPPLE ON A HOSE

Rudolf Kaiser, Ettlingen, Baden, Germany, assignor to Aeroquip Corporation, Jackson, Mich., a corporation of Michigan Application June 23, 1950, Serial No. 169,900

1 Claim. (Cl. 153—1)

The conventional end fitting for flexible hose comprises a socket gripping over the hose end and a nipple inserted in the hose end, said nipple carrying the cap nut and being screwed in the socket. As has been known, the fitting is assembled by placing the socket on the hose end, whereupon the nipple is screwed in the socket and the hose end. During this assembling operation, the socket, the hose and the nipple are exerting high pressures on one another with the result that the cold-flowing hose material is deformed after a certain time to such an extent that a firm attachment of the hose with the desired tightness is no longer assured.

These advantages are avoided according to the invention by clamping, in case of hose comprising a core and a jacket, the latter between the socket and the screw nipple, while the core is clamped between the nipple and an inner pipe piece which advantageously is pressed on the inner wall of the hose core by a subsequent expanding operation. A cold-flowing of the material is avoided to a great extent by this separate clamping of the hose jacket and the hose core. Simultaneously, a double sealing is obtained, because the hose core is additionally pressed on the screw nipple located between said core and the hose jacket, when pressure is acting in the interior.

When the new hose fitting is to be assembled, the pipe piece suitably provided with a collar is inserted in the hose end and the latter with the jacket is introduced in the socket. Thereafter, the screw nipple is placed on a tool and screwed into the socket in such a manner that it enters between the core and the jacket, whereby the core is pressed on the pipe piece and the jacket on the socket. The pipe piece will then be subjected locally to an expansion step producing one or several expanded rings thereon. This operation is preferably carried out with the aid of the assembling tool for the screw nipple, the mandrel of said tool being axially displaceably guided in the handle and being provided with an upsetting ring of elastically deformable material, located between an abutment shoulder of the handle and a collar.

The new hose fitting and the tool to assemble it will be described in detail in the following with reference to the drawing, in which:

Fig. I is a longitudinal section through the hose end with the fitting attached, Fig. II shows the tool in its initial position, Fig. III shows the socket and pipe piece in position on the end of the hose, Fig. IV shows the tool with the screw nipple placed thereon, and Fig. V shows the finished connection between hose end and fitting before the tool is removed.

The new hose fitting comprises the conventional socket 1 receiving the hose jacket, a screw nipple 2, the inner diameter of which corresponds to the outer diameter of the hose core 3, and a pipe piece 4 with an outer diameter corresponding to the inner diameter of the hose core 3. The pipe piece 4 is provided with a collar 5 and the screw nipple 2 carries the cap nut 6 in the usual manner.

Before the mounting is assembled, the hose jacket 7 is removed about the length of the threaded neck 8 of the socket, whereupon the socket 1 is placed on the jacket 7 and screwed thereon. Thereafter, the pipe sleeve 4 is inserted in the hose core 3 until it engages the collar 5 at the end of said core (see Fig. III). Now the screw nipple 2 is applied and screwed in the socket 1. During this step, the screw nipple 2 enters between the jacket 7 and the core 3 pressing with its threadlike inner protrusions 12 the core 3 on the pipe sleeve 4 and the jacket 7 on the hose socket 1. Thereafter, the pipe piece 4 at the location of the screw nipple 2 is expanded at 19 to more effectively press the hose core 3. The hose core 3 in this three-piece mounting acts as an additional lip sealing which is biased to a certain extent by the expanding of the pipe sleeve 4.

The tool for screwing in the nipple 2 comprises a handle member 20 with a seat surface 21 for the sealing cone 10 of the nipple and an outer threading 11 adapted to receive the cap nut 6 firmly securing the nipple 2 to the tool during the screwing operation. The guiding mandrel 13 for the nipple conventionally used in these tools is axially displaceable in the handle member 20 and its rear end is provided with threading 14 adapted to receive an adjustable nut 15. The mandrel 13 has a portion extending beyond the handle member and carrying a sleeve 16 of elastically deformable, but incompressible, material such as natural or synthetic rubber, or the like, which is held in place by a collar 17, the outer diameter of said sleeve 16 corresponding to the inner diameter of the pipe sleeve 4.

When the adjustable nut 15 is tightened after the nipple 2 is screwed in, the mandrel 13 is displaced in axial direction with respect to the handle member 20. As a result of this, the sleeve 16 between the ring 17 and the abutment shoulder 18 of the handle member is upset. As the sleeve is made of elastically deformable, but incompressible, material this shortening of its length results in a radial deformation of the sleeve 16 toward the pipe sleeve 4 which is expanded under the action of the pressure exerted by the sleeve 16 and pressed into the hose core (see Fig. V). After the pipe sleeve 4 has been expanded, the adjustable nut 15 is loosened, whereupon the sleeve 16 returns to its original form and the tool can be removed from the threading 11 in the usual manner after loosening of the cap nut 6.

Having thus described my invention what I claim as novel and desire to protect by Letters Patent is:

A tool for assembling a nipple between inner and outer layers of a flexible hose, with a socket mounted about the exterior surface of the outer hose layer and a deformable sleeve mounted within the hose bore defined by the interior surface of said inner hose layer, said nipple, socket and sleeve forming a hose end fitting, said tool comprising an integral body part with an exteriorily threaded portion and a bore extending axially therethrough, in concentric relation to said threaded portion, a handle on said body part actuatable to rotate said body part, said body part defining at one end thereof an annular recess with a wedge taper end surface surrounding a sleeve extension at said body end, said sleeve extension providing a continuation of said bore and said recess being formed to receive a nipple in spaced surrounding relation to said sleeve extension with an end of the nipple held engaged against said wedge taper end surface, an elongated mandrel slidably mounted in said bore and having an enlarged end portion projecting beyond the end of said sleeve extension remote from said body part, an upsettable sleeve mounted about said mandrel and confined between said enlarged end portion and the corresponding end of said sleeve extension, said mandrel being screw-threaded at its opposite end, said end projecting beyond the end of the body part remote from said taper recess, said enlarged mandrel end portion and said upsettable sleeve being formed to be introduced axially into the said end fitting sleeve with said nipple in spaced concentric relation to said mandrel end portion and upsettable sleeve, and a single adjustment nut on said projecting screw-threaded end portion of said mandrel and engaged against said remote end of said body part, said nut being actuatable to retract the mandrel within said body part and thereby expand said upsettable sleeve.

References Cited in the file of this patent

UNITED STATES PATENTS

| | | |
|---|---|---|
| 355,144 | Dalzell | Dec. 28, 1886 |
| 1,753,005 | Grady | Apr. 1, 1930 |
| 2,146,756 | Miller | Feb. 14, 1939 |
| 2,254,577 | Nelson | Sept. 2, 1941 |
| 2,258,919 | Wallace | Oct. 14, 1941 |
| 2,262,171 | Downes | Nov. 11, 1941 |
| 2,294,640 | Wallace | Sept. 1, 1942 |
| 2,370,776 | Carlson | Mar. 6, 1945 |
| 2,370,840 | Carlson | Mar. 6, 1945 |
| 2,377,010 | Howard | May 29, 1945 |
| 2,433,425 | Burckle | Dec. 30, 1947 |

FOREIGN PATENTS

| | | |
|---|---|---|
| 562,970 | Great Britain | July 24, 1944 |